April 4, 1967 E. C. HENRIKSEN 3,312,406
MOTION PICTURE PROJECTOR
Filed April 30, 1964 3 Sheets-Sheet 1
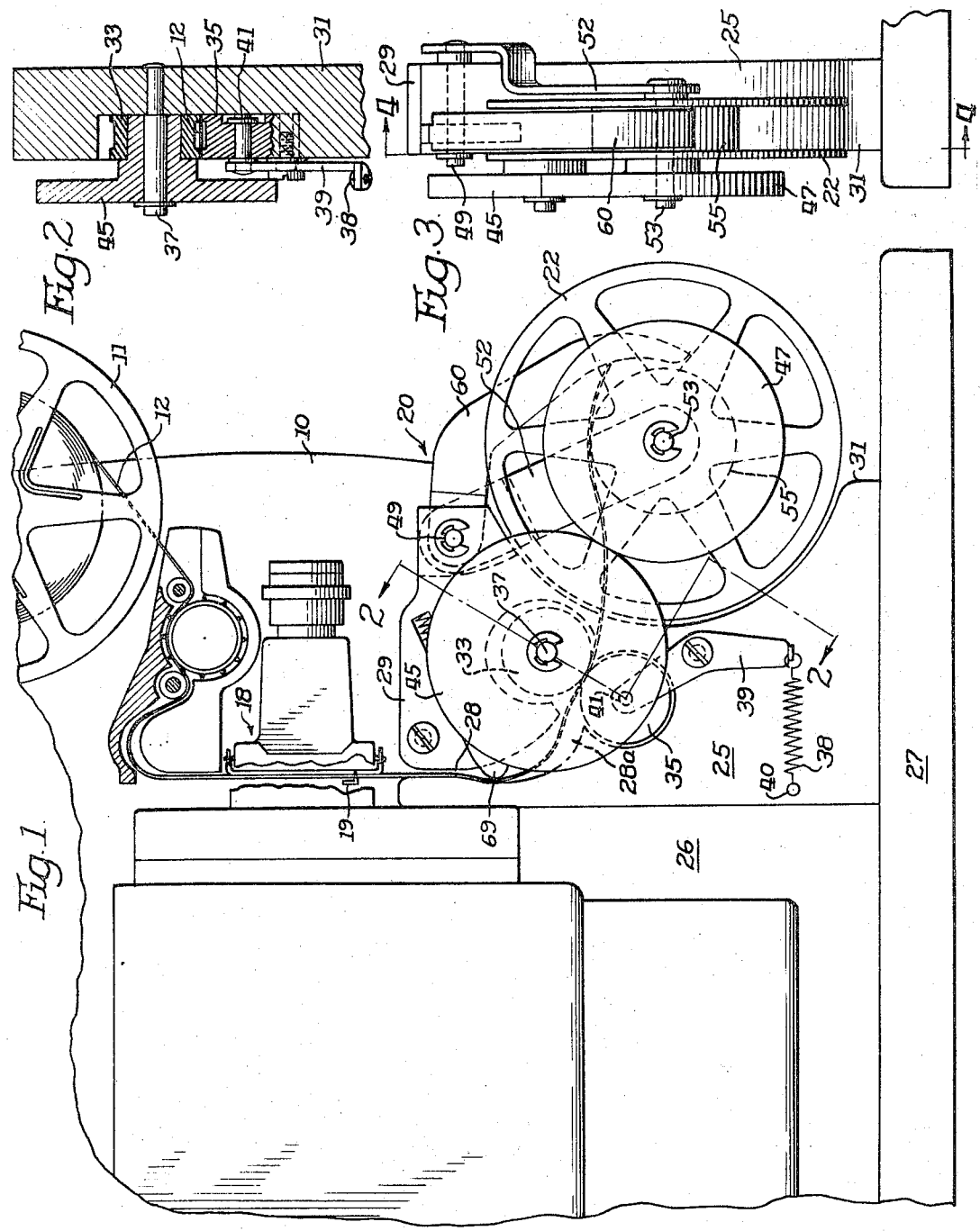
Inventor:
Elmer C. Henriksen.
By Barry L. Clark
John E. Peele Jr.
Attys

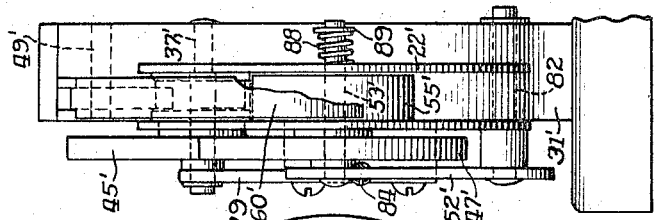
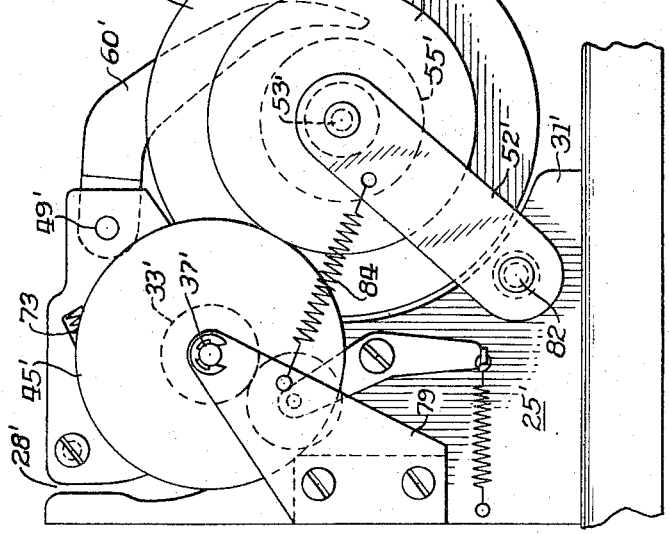
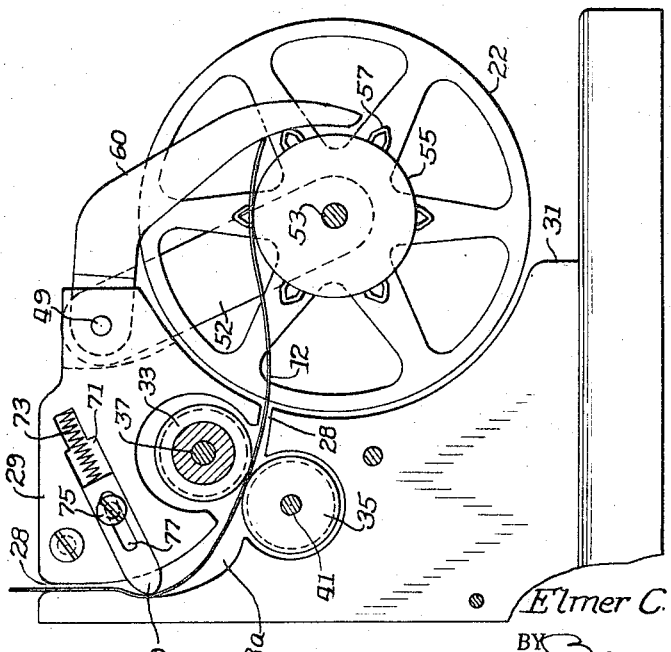

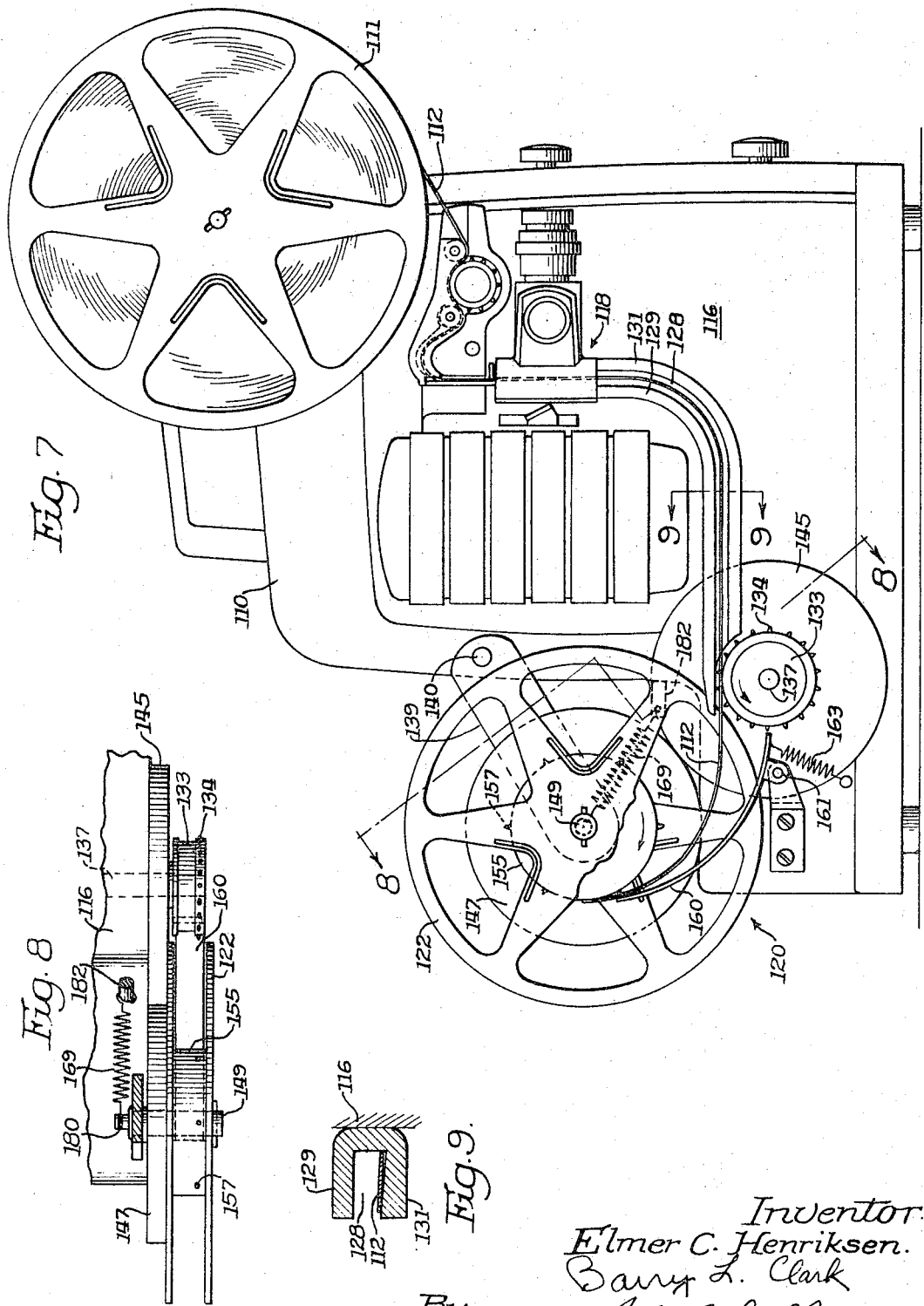

United States Patent Office 3,312,406
Patented Apr. 4, 1967

3,312,406
MOTION PICTURE PROJECTOR
Elmer C. Henriksen, Chicago, Ill., assignor to Bell & Howell Company, Chicago, Ill., a corporation of Illinois
Filed Apr. 30, 1964, Ser. No. 363,816
11 Claims. (Cl. 242—55.11)

The present invention relates to a method and apparatus for winding a web on a reeling assembly, which assembly is driven by the force exerted on the web by a feeding means.

In many mechanisms for winding webs upon reeling members, problems have occurred with respect to applying adequate controlled torque to the reeling assembly in relation to the rate of movement of the web toward the assembly, yet not breaking or stretching the web or permitting the web to loosely wind itself about the reel member of the reeling assembly. Particularly with positive drives, such as gears, attempts to solve these problems have required the provision on or about the reel member support or drive shaft of slip clutches or other torque controlling mechanisms which necessarily add to the complexity of the apparatus. These problems are further increased when the web or film, in the case of motion picture projectors, is later to be unwound from the reel member without removing the reel member from the support or drive shaft of the assembly.

Broadly, the instant reeling assembly is disclosed as applied to a motion picture projector in which the reel member of the assembly has no direct driving connection with the projector motor drive but receives its drive power from the movement of film across the peripheral surface of a movable member, such as a roller or belt. The motion of the movable member is then imparted to the reel member through motion transmitting elements which may include either the preferred friction disc drive, selected gearing, a belt drive or the like. The assembly further includes a guide channel for directing the film from the drive of the projector shuttle tooth toward the reel member on which the film is wound after projection. The leading end of the film, upon reaching the reel member, may be automatically attached to the hub thereof or elements thereon in a manner such that the end of the film may be readily pulled away from the hub without damaging the film when the film is rewound onto the supply reel. As an adjunct to an automatic threading projector, the securing action is preferably such that the film secures itself to the hub without aid from the projector operator, yet is sufficiently secured to permit the remainder of the film to wind itself around the reel member.

An object of the present invention is to provide a drive for a web reeling assembly in which the power to drive the assembly is obtained from the force exerted on the web by a feeding means.

Another object is a novel method of reeling a web using the power exerted on the web by a feeding means to drive the reeling assembly.

A further object is to provide apparatus which will efficiently wind film on a take-up assembly without inadvertently damaging the film through the inability of the take-up apparatus to control the torque necessary to wind the film.

A still further object is to provide a channel means to positively guide a web onto a reeling assembly to insure driving of the assembly by the web.

Still another object of the invention is to provide a take-up assembly wherein the take-up reel is powered solely by movement of the film through the projector in engagement with the periphery of a roller and on to the take-up reel wherein the roller and the take-up reel are in operative relationship through transmission elements.

Yet another object of the invention is to provide in a web reeling assembly a guide having an enlarged portion to permit a small web loop to build up therein.

An additional object is to provide in a web reeling assembly a guide and a snubber means extending into the guide to aid in controlling the film pasing therethrough.

The aforegoing and other objects of the invention will be seen from the specification and drawings forming a part thereof, wherein:

FIGURE 1 is an elevational view, in partial section, of a portion of a motion picture projector having a film powered take-up assembly;

FIGURE 2 is a cross sectional view taken on section line 2—2 of FIGURE 1;

FIGURE 3 is an end view of the take-up assembly of FIGURE 1;

FIGURE 4 is a cross sectional view taken on section line 4—4 of FIGURE 3;

FIGURES 5 and 6 are an elevational and end view, respectively, of a modification of the take-up assembly;

FIGURE 7 is an elevational view, in partial section, of a motion picture projector with a modified form of film powered take-up assembly thereon;

FIGURE 8 is a cross sectional view taken along section line 8—8 of FIGURE 7;

FIGURE 9 is a cross sectional view taken along section line 9—9 of FIGURE 7 showing the guide channel.

Shown in FIGURE 1 is a motion picture projector 10 incorporating a preferred form of film powered take-up assembly. A supply reel 11 carrying motion picture film 12 to be projected is placed on the projector supply spindle (not shown) in a conventional manner. The conventional structure of the supply portion of the projector is not further described since it forms no part of the present invention. The film 12 is passed from supply reel 11 to a projection area or gate 18 to be intermittently transported by a normally operating intermittent film feed or shuttle tooth means 19 toward a take-up assembly 20 and the take-up reel 22 of the take-up assembly.

Take-up assembly 20 is formed of a body portion 25 either mounted on the projector mounting plate 26 or base 27. The body portion 25 has a guide channel 28 formed therein dividing at least a portion of the thickness of the body portion into an upper body member 29 and a lower body member 31. This guide channel leads the film from the projection area 18 to a position to be fed between a normally freely rotatable film contact roller 33 and a similar pressure roller 35.

Contact roller 33, which is preferably a toothless sprocket wheel but may be a conventional toothed sprocket wheel, is mounted on a rotatable shaft 37. The periphery of the roller is formed such that the film contact area is restricted to that portion of film 12 in which no image exists, i.e., along the longitudinal edges (as seen in FIGURE 2). The engaging surfaces of roller 33 are preferably surfaced with a material such as rubber, to provide a better traction surface for the driving of the roller by the film. Since only the edges of the film are engaged by the contact roller, the image surface of the film cannot be scratched should the roller not rotate. When using a conventional sprocket roller, it is obvious that the teeth will mate with the perforations in a conventional manner.

The pressure roller 35 may be similarly formed with a peripheral traction surface to ride against the edges of the other side of the film and be rotated by movement of the film. The force with which this roller contacts the film is obtained from a resilient means 38, preferably a coil spring, attached between one end of a pivoted arm 39 and a pin 40 in body portion 25. The other end of the arm 39 supports a shaft 41 about which the pressure roller freely rotates. Thus, pressure roller 35 contacts one side of the film under pressure and causes contact roller 33 to be rotatably driven as the film passes between the rollers. The rotation of roller 33 creates sufficient torque to drive the remaining rotatable elements of the take-up assembly 20.

Also mounted on shaft 37 is a driving disc 45 which rotates with contact roller 33. The roller 33 and disc 45 may be keyed or otherwise mounted on the shaft for rotation together, as shown in FIGURE 2 in which roller 33 is a cylinder fixedly fitted on a reduced portion of the disc. Disc 45 may be formed of a metal, such as brass, if it is desired to provide an added "fly-wheel" effect to alter the stop-start motion of the film to smooth the feed of the film onto take-up reel 22 and the rotation thereof.

As the contact roller 33 and the pressure roller 35 are rotated by the film 12 moving therebetween, a driven disc 47 is simultaneously rotated by the driving disc 45. The periphery of driving disc 45 engages the periphery of driven disc 47 with a slight force so as to cause sufficient traction with minimum slippage between the peripheral surfaces to obtain substantially the same rate of rotation by the driven disc 47 as the rotational rate of the driving disc 45. Preferably, the pressure of driven disc 47 on driving disc 45 results solely from the weight of the driven disc and other associated elements pivotally carried about shaft 49 supported by body portion 25; however, the pressure may be augmented by a biasing means (not shown), if desired. Pivotally suspended from shaft 49 is an arm 52 of a length determined by the diameter of the proposed reel necessary to accommodate the number of feet of film to be wound thereon. In the free end of arm 52 is rotatably mounted a take-up spindle 53, connected by keying or otherwise so as to be rotated with driven disc 47 or to serve as a take-up spindle on which take-up reel 22 is mounted to be rotated therewith. A preferred form of reel 22 is disclosed as being non-removable in normal use. It is noted that the ratio of the diameters of the contact roller 33, the driving disc 45, driven disc 47 and the hub 55 of the take-up reel 22 are such that the hub rotates at a slightly faster rate than the contact roller such that a limited amount of torque will be generated by the take-up reel to cause the film convolutions to be wound sufficiently tight about the hub. Reel 22 preferably has some means on or adjacent to the hub to cause the end of the film to be retained next to the hub. Such means as are shown in FIGURE 4 are in the form of spring fingers 57 adjacent one or both flanges of reel 22 and intended to clamp the film near the reel hub as the film is directed toward same by a hold down member 60.

Hold down member 60 is pivoted on shaft 49 and is sufficiently thin (as seen in FIGURE 3) to fit between the flanges of take-up reel 22 over most of its length. Film passing onto the take-up reel 22 is fed through the guide channel 28 beneath the hold down member which aids in maintaining the film adjacent the hub of the take-up reel. As the reel rotates, the hold down member maintains the respective convolutions of the film against the hub and pivots outwardly toward the reel periphery as the convolutions of film build-up thereunder.

Guide channel 28 is positioned to direct the movement of film between the contact roller 33 and the pressure roller 35 and to a point adjacent the hub slightly over a center line through the take-up spindle axis so that the clockwise rotary movement of the reel on the spindle would carry the end of the film with it, eventually catching the end of the film between spring fingers 57 and thus causing the film to be wound about the hub 55 of the reel.

To further smooth movement of the film through the guide channel 28 when feeding and to allow a small film loop to build up, if necessary, a scoop area 28a is provided near the channel entrance in the lower body member 31. (See FIGURE 4.) Cooperating with scoop 28a is a resiliently mounted snubber member 69. The snubber member moves longitudinally relative to a groove 71 in the upper body member 29 of body portion 25. Interiorly of the groove is located a coil spring means 73 which resiliently biases the rounded end of the snubber into the scoop. A pin 75 is mounted in the body member 29 and extends through slot 77 in the snubber to limit the longitudinal movement of the snubber as the snubber moves relative to the pin in accordance with the tautness of the film riding over the end thereof.

Thus, the operation briefly is as follows: As the film is directed into guide channel 28 from the projection area 18 by powered feed means or shuttle tooth 19, the lead end moves between contact roller 33 and pressure roller 35. As previously indicated, motion of the film in contact with the periphery of contact roller 33 causes rotation of take-up reel 22. The lead end of the film is guided further through guide channel 28 toward the hub 55 of reel 22 under the supplemental guiding of hold down member 60. The lead end of the film subsequently is engaged by holding means 57 located adjacent the hub to direct the remainder of the film therearound.

Reference is made in FIGURES 5 and 6 to a modified form of film powered take-up assembly. On body member 25' is fixedly mounted a bracket member 79 which supports shaft 37'. About this shaft is carried a film driven contact roller 33' and driving disc 45', which are rotated in the manner previously described by film fed through guide channel 28'. The periphery of the driving disc 45' is in operative engagement with the periphery of driven disc 47'. The latter disc is rotated with shaft 53' and take-up reel 22' as contact roller 33' is powered by film moving in engagement with the periphery thereof. Shaft 53' is mounted in an end of the reel support arm 52' which is pivotally mounted to rotate about a shaft 82 fixed in lower body member 31' of body portion 25'. Traction engagement between the peripheries of the driving and driven discs is maintained by resilient means 84 connected between fixed bracket 79 and the movable end of reel support arm 52'.

The take-up reel 22' differs from the previously described reel in that the retaining pressure applied to the edges of film as it is moved adjacent to hub 55' is a result of the spring means 88, generally concentric about an end of shaft 53' between the exterior of the movable flange of the reel and a washer member 89 locked onto the end of the shaft to hold the movable flange in pressure contact with the hub. The hub of the reel is of an axial length slightly less than the width of the film to be accepted on the reel.

In FIGURES 7–9 is disclosed a motion picture projector 110 with a film powered take-up assembly 120 similar to the assemblies previously described with respect to FIGURES 1–6. In this construction, the film 112 passes from the projection area 118 to a guide channel 128 attached to the mounting plate 116 and formed of an upper guide channel or body member 129 and a lower guide channel or body member 131. This guide channel directs the end of the film over and into engagement with conventional sprocket teeth 134 on the periphery of the contact roller 133 which is mounted adjacent the end of the lower channel member 131. The upper channel member 129 extends rearwardly of the projector beyond the lower member and over contact roller 133 so as to maintain the sprockets of film passing thereunder on the sprocket teeth. Thus, as film moves through the projector, the contact roller is drivingly rotated counterclockwise. The roller is given a positive driving action for rotation in the direction of movement of the film by the sprocket holes of the film engaging the sprocket teeth of the roller. It is noted that the roller 133 may be of the toothless variety as previously described.

Rotating with contact roller 133 and either formed integrally with it or keyed on a shaft 137 with it, is a driving disc 145. The periphery of the driving disc rotates in frictional engagement with the periphery of a driven disc 147. The driven disc is mounted on a shaft 149 which forms either the spindle of a built-on take-up reel (such as previously described) or a take-up spindle on which the conventional reel 122 is located in the usual manner.

In the area substantially between the axis of rotation of the take-up reel 122 and driving disc 145 is a curved guide member 160 which is pivoted on a shaft 161 mounted on the projector mounting plate 116. One end of guide memer 160 is biased by a spring means 163 toward hub 155 of the reel 122 to direct the film toward same. The other end is positioned to allow the film to be stripped from the periphery of the contact roller 133.

As the film is stripped from contact roller 133, the lead end follows the curve of guide member 160 to the vicinity of hub 155 of reel 122. About the hub are located several tabs or sprocket teeth 157, at least one of which will seat in a sprocket hole near the lead end of the film and thus start the first convolution of film about the hub.

The driven disc 147 and shaft 149 are supported in an end of arm plate 139 which is pivoted on a shaft 140 mounted in projector mounting plate 116. The weight of the driven disc and reel are normally sufficient to maintain the periphery of the driven disc 147 in engagement with the periphery of driving disc 145. However, this engagement is supplemented by spring member 169 attached between a groove 180 in shaft 149 and a pin 182 extending from mounting plate 116.

Particular reference is made to the preferred embodiment wherein the web or film need not have sprocket holes to enable it to drive a reel member when passed in engagement with a roller means transmitting movement to the reel member. Although the preferred embodiments have each related to a motion picture film projector, the instant inventive concept is deemed to be applicable to the reeling of web materials other than motion picture film. Similarly, the concept is not intended to be restricted to applications with automatic threading of the web onto the reel member.

In the instant specification, certain preferred embodiments have been described; however, they are not intended to limit the invention to the details set forth with respect thereto, since modifications may be made without departing from the spirit of the invention as defined in the claims.

I claim as my invention:

1. A method of winding film upon a take-up reel of a motion picture projector, the steps of the method including: advancing the film from the projection area of the projector by film drive means, causing said film to engage a roller adapted to be rotated when said film is moved over the periphery thereof, transmitting the rotation of said roller to a take-up reel so as to rotate said reel as the roller is rotated, and directing said film to said take-up reel whereby said film is wound upon the reel after causing said roller to drive said reel.

2. In a motion picture projector having means to feed film from the projection area thereof toward a take-up assembly powered solely by force exerted upon the film by said feeding means at said projection area, the take-up assembly including:
   a film take-up means;
   means to guide film into engagement with a rotatable member intermediate the feeding means and said take-up means;
   said rotatable member being rotatable solely in response to engagement by said moving film as said film moves from said projection area; and
   means operable between said rotatable member and said take-up means to transmit said rotary movement of said rotatable member to said film take-up means.

3. The assembly as in claim 2 wherein said transmitting means rotates said take-up means at a rate sufficient to create a torque between film of said take-up means and the film in engagement with said rotatable member.

4. The assembly as in claim 2, wherein said transmitting means includes a pair of cooperating means, one of which is in operative connection with said rotatable member, and the other of which is in operative connection with said take-up means.

5. The take-up assembly as in claim 4 wherein said cooperating means are a pair of discs, the peripheries of which are adapted to be maintained in engagement.

6. An assembly as in claim 4 wherein one of said pair of cooperating means is a driving disc coaxial with said rotatable member and rotatable thereby; and
   said other cooperating means is a driven disc coaxial with said take-up means and rotatably mounted for peripheral engagement with said driving disc to transmit rotary movement to said take-up means.

7. The take-up assembly as in claim 2 wherein said transmission means includes a first and second means cooperating to transmit said rotating movement of said rotatable member to a take-up means, said first transmitting means being operatively connected to said rotatable member, and said second transmitting means being operatively connected to said take-up means.

8. The assembly as in claim 2 wherein said rotatable member is a roller positioned adjacent said guide means, said roller having axially spaced portions to engage edges of the film alongside the image area thereof.

9. An assembly as in claim 2 wherein said take-up means has a hub portion, and means adjacent said hub portion to engagingly retain at least the first convolution of a film adjacent said hub portion.

10. An assembly as in claim 2 wherein said guide means includes a first portion to guide the film from the feed means into engagement with the rotatable member, and a second portion to guide said film from said rotatable member toward said take-up means.

11. An assembly as in claim 10, wherein said first guide portion is enlarged intermediate its ends, and a snubber means is slidably movable into said enlarged portion of said guide means to engage film passing therethrough.

References Cited by the Examiner

UNITED STATES PATENTS

| 1,942,890 | 1/1934 | Wittel | 242—55.13 |
| 2,085,439 | 6/1937 | Morlock | 242—55 X |
| 2,374,038 | 4/1945 | Ress | 242—55.14 |
| 2,379,690 | 7/1945 | Cunningham | 242—55.13 |
| 2,506,354 | 5/1950 | Green | 242—105 |
| 2,657,871 | 11/1953 | Pettus | 242—55.14 |

FOREIGN PATENTS 937,805  9/1963  Great Britain.

FRANK J. COHEN, *Primary Examiner.*

GEORGE F. MAUTZ, *Examiner.*